March 6, 1962     H. E. TURNUPSEED ETAL     3,024,397
SAFETY SYSTEM FOR SINGLE PHASE MOTORS
Filed July 30, 1959
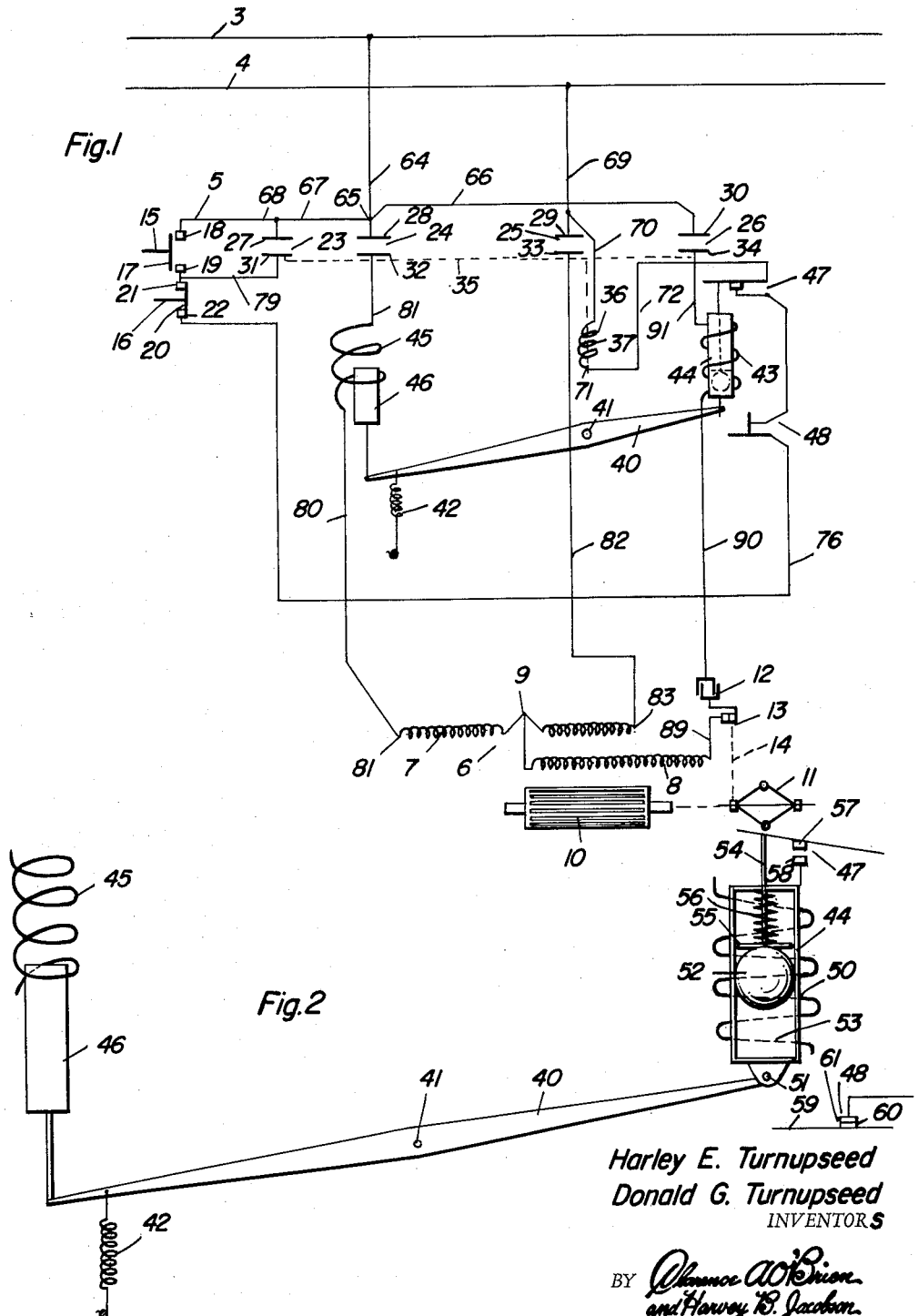
Harley E. Turnupseed
Donald G. Turnupseed
INVENTORS

United States Patent Office 3,024,397
Patented Mar. 6, 1962

3,024,397
SAFETY SYSTEM FOR SINGLE PHASE MOTORS
Harley E. Turnupseed, 750 Auburn St., and Donald G. Turnupseed, 627 N. N Place, both of Tulare, Calif.
Filed July 30, 1959, Ser. No. 830,496
7 Claims. (Cl. 318—221)

This invention relates to electric motor protective devices as applied to single phase motors equipped with starters.

An object of the invention is to provide an electric motor assembly that includes conventional starting and running windings and a conventional starter furnished with a holding coil, with a protective circuit integrated with the starter, its holding coil, and the circuit connections made between the starter, the lines and the windings of the motor.

Briefly, the protective circuit functions to open the holding coil circuit if an excessive current or prolonged load exists in the starting winding. The protective circuit also operates to open the circuit of the motor if, for one reason or another, the starting winding is not energized, and the motor receives energy directly to the running windings thereby pulling excessive current. The same operation takes place if there is an excessive overload on the motor running winding while it is in a normal operating running cycle.

To achieve all of the above results there are two load coils and load coil armatures mechanically coupled together for simultaneous movement, for instance by a beam, and one of the load coils is connected in series with the motor running winding, and the other is connected in series with the motor so that the load coils are arranged operatively with two of the conventional interlock switches of a conventional starter for the motor.

The load coil that is arranged to detect an excessive overload current condition in the starting winding collar has its armature arranged to actuate a normally closed switch which controls the energization of the conventional holding coil of the starter thereby interrupting the holding coil circuit and enabling the starter to return to the motor non-energizing position before any serious damage of the motor windings.

Other objects and features of importance will become apparent in following the description of the illustrated form of the invention.

FIGURE 1 is a diagrammatic view showing the protective circuit operatively associated with a single phase A.C. motor and a starter for the motor; and FIGURE 2 is an elevational view showing a detail of construction of the protective device.

In the accompanying drawings lines 3 and 4 are ordinary A.C. lines representing a potential electromagnetic protective device used in connection with a three pole magnetic starter 5 for the protection of a single phase capacitor motor 6. Starter 5 and motor 6 are shown diagrammatically inasmuch as the starter structure and motor structure are each conventional. Motor 6 has a main or running winding 7 together with a starting winding 8 connected with a running winding 9. Armature 10 actuates centrifugal device 11 but, of course, the centrifugal device may be rotated by a part other than armature 10 but which rotates at a speed proportional to the rotation of rotor 10. Capacitor 12 is connected at one end with the end of the starting winding 8 opposite to that attached at tap 9. Normally closed switch 13 is connected in series with capacitor 12 and starting winding 8 and is mechanically opened, as represented by the dotted line 14, with the centrifugal device 11 at such time that the motor rotor 10 comes up to design speed. If motor 9 is equipped with a run condenser, it would be shunted across the capacitor 12 and switch 13.

Starter 5 has two manual switches 15 and 16, these ordinarily being push-button switches with switch 15 being the start switch and a normally open switch, and switch 16 being the stop switch and a normally closed switch. Switch 15 has a switch arm 17 adapted to bridge contacts 18 and 19, while switch 16 has a switch arm 20 adapted to bridge contacts 21 and 22, noting that the contacts 19 and 21 are connected. There are four interlock switches 23, 24, 25 and 26 which have stationary contacts 27, 28, 29 and 30 together with movable contacts 31, 32, 33 and 34. The movable contacts are mechanically coupled for simultaneous actuation, and this is represented by the dotted line 35 which can represent a frame or the like. Holding coil 36 is provided with an armature 37 to which frame 35 is secured. Essentially, the above briefly describes the structure of a conventional motor of a type under consideration, and a conventional three pole magnetic starter.

The protective device for motor 6 is composed of a beam 40 mounted for oscillatory movement on pivot 41 and opposed in its movement in one direction by means of spring 42 which is attached to the beam and anchored at its ends respectively. A first load coil 43 is located near one end of beam 40, and it has a first load armature structure 44 connected therewith. A second load coil 45 is near the opposite end of the beam 40 and has a second load armature 46 operatively associated therewith. Normally closed switches 47 and 48 are adapted to be opened in response to movement of the armature structure 44 as influenced by excessive current overload in either the starting winding circuit or the running winding circuit of motor 6. This will be described in more detail subsequently.

Armature structure 44 is made of a receptacle 50 having a pivot connection 51 connecting it to one end of beam 40. A freely movable and captive mechanical element, for example, steel ball 52, is disposed in receptacle 50 and in a buffing substance, e.g. oil 53 contained in receptacle 50. Rod 54 extends through the upper open end of receptacle 50 or through a hole in the top of the receptacle and has a transverse bar or plate 55 at its lower end which is in contact with the steel ball 52. A light compression spring 56 is concentric on rod 54 and bears against the top of receptacle 50 and against plate 52, lightly and yieldingly holding the rod 54 downwardly so that the plate 55 lightly contacts steel ball 52. The upper end of rod 54 is mechanically connected or in some way engaged with switch 47 to displace the movable contact 57 thereof away from stationary contact 58 and thereby open switch 47. The lower part of beam 40 or the lower part of container 50 is movable to a position at which it engages switch arm 59 of the normally closed switch 48 to displace the movable contact 60 in a direction which separates it from stationary contact 61 of switch 48 and thereby opens switch 48.

The various wiring connections establishing electric circuits in the system disclosed in FIGURE 1 are important since they enable the objective of the protective device to be achieved in a single phase electric motor assembly. These wiring connections and the various electrical circuits are subsequently simultaneously described with the operation of the invention. Normal current and voltage exist at lines 3 and 4 which are connected with the three pole starter 5 by means of conductor 64 extending between line 3 and terminal 65 which is connected by means of shunt 66 with stationary contact 30 of interlock switch 26. Terminal 65 and consequently, stationary contact 28 of switch 24 which is connected therewith, is connected to the interlock switch 23 stationary contact 22 by way of shunt 67. Contact 22 is connected with contact 18 of switch 15 by means of conductor 68. The other side 4 of the line is connected to switch 25 by having conductor 69 connected to line 4 and to the stationary contact 29. The stationary contact 29 position furnishes current to holding coil 36 by way of conductor 70, and the holding coil has one end 71 connected by means of conductor 72 to movable contact 57 of switch 47 enabling current to flow through the normally closed switch 47 to the normally closed switch 48 by way of the stationary contact 58 and stationary contact 61 of switches 47 and 48, respectively.

Conductor 76 extends from the movable contact 60 of switch 48 to contact 22 of stop switch 16 from which current may flow through switch 16 of the start-stop station to contact 31 of interlock switch 23 by way of conductor 79.

When actuation of motor 6 is desired, switch 15 is closed causing current to flow from line 3, through conductor 64 to terminal 65, through conductor 67 to the contact 27 of interlock circuit switch 23, and through conductor 68 to contact 18 of switch 15. Current flows through this switch and also through the parts of switch 16 and through conductor 76 to switch 48. Current continues to flow through a part of conductor 76 between switches 48 and 47, through the normally closed switch 47 to the lower end 71 of holding coil 36 and through the holding coil to conductors 69 and to the line 4. This energizes holding coil 36 causing the interlock circuit switches 23, 24, 25 and 26 to be simultaneously closed at which time the operator releases switch 15 so that it may return to its normal (open) position. This interrupts the circuit at the start-stop station of the starter 5 and now current will flow from line 3 through conductor 64, terminal 65, conductor 67, switch 23 (which is now closed), conductor 79, switch 16, conductor 76, both switches 48 and 47, a conductor 72, the holding coil 36 and ultimately to line 4 by way of conductors 70 and 69. This causes the starter 5 to remain in the operating position.

Conductor 80 and conductor 64 are termed a first conductor operatively connecting one end 81 of running winding 7 with line 3. Conductor 80 is attached to one end of the load coil 45, the other end of the load coil being attached by way of a part 81 of conductor 80 which is secured to the movable contact 32 of switch 24. Accordingly, current for the single phase main or running winding 7 will flow from power line 4 through conductor 69 which, coupled with conductor 82 is termed a second conductor, interlock switch 25 to which conductor 82 is secured, the end 83 of running winding 7 through the motor main terminals 9 to terminal 81 through the previously mentioned first conductor, the second load coil 45 in the first conductor and to the other power line 3. In addition starting winding current will flow from power line 4 through conductor 69 to the starter interlock switch 25 through conductor 82 through the running winding 7 to terminal 9 thereof and through the phase or starting winding 8 to the normally closed cutout switch 13 by way of conductor 89 and through capacitor 12 to shunt 90 which is attached to one side of the capacitor 12, the other side being connected with switch 13. Shunt 90, coupled with conductor 91 and conductor 66 constitutes what is termed arbitrarily, a third conductor. Shunt 90 is attached to one end of the load coil 43, while conductor 91 is attached to the other end thereof and also attached to the movable contact 34 of switch 26. Shunt 66 extends from the fixed contact 30 of switch 26 to terminal 65 and ultimately connects with power line 3 by way of conductor 64.

As motor 6 reaches the required speed, the centrifugal device 11 will open the contacts of the normally closed cutout switch 13 thereby disconnecting the starting or phase winding 8. The starting winding 8 coupled with capacitor 12 and the third conductor constitutes a starting circuit for the motor, and this is interrupted by the opening of switch 13 during normal use of the motor.

The running winding circuit includes running windings 7 and the electrical conductors operatively associating it with the source of electrical power. The holding coil 36 is part of a holding coil circuit which includes the pertinent parts of the circuitry of the conventional starter 5.

It is to be noted that when cutout switch 13 opens in response to actuation of the governor 11, the third conductor, i.e., conductors 90 and 91, are opened insofar as establishing an electrical circuit between the power lines and starting winding 8 is concerned. This automatically deenergizes the first load coil 43. Inasmuch as switch 47 is a normally closed switch, the single phase motor 6 is permitted to operate as an induction run motor.

Should the centrifugal device 11 fail to open switch 13 an excessive current or pull on the load on coil 43 will cause the steel ball 52 armature to become elevated as oriented in the drawings and thereby open switch 47 with the liquid substance 53 acting as a buffer. This interrupts the holding coil 36 circuit thereby deenergizing coil 36 and allowing the holding coil armature 37 to be returned to the rest position at which interlock switches 23, 24, 25 and 26 are opened. This disconnects the running winding circuit and starting winding circuit from line current before damage can be done to the starting winding which sometimes happens upon prolonged exposure to line current. When the motor is in the starting position, i.e. upon momentarily closing switch 15, should capacitor 12 be or become defective, or should the normally closed cutout switch 13 fail to make contact, no current will flow through the first load coil 43 since it will not become energized. This will permit running of the motor on the main or running winding 7 and this is not good because it will pull an excessive current load. However, this excessive current will also load the loading coil 45 and build up a strong magnetic field displacing the armature 46 against the yielding opposition of spring 42 reacting on beam 40. As a consequence, the armature structure 44 will be displaced in a direction to open switch 48. It is evident from the preceding description of opening switch 47, that the holding coil circuit which includes holding coil 36 will be interrupted allowing the starter interlock switches 23, 24, 25 and 26 to return to the normal position thereby disconnecting the motor winding circuits from the lines 3 and 4 before any damage can be caused by excessive current in the main running winding while it is in an inoperative position. The same operation takes place should there be an excessive overload on the motor running winding 7 while it is under normal operating conditions, i.e. during a normal duty load.

The foregoing is considered to illustrate only the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. In an electric motor assembly which has a rotor, a running winding circuit provided with a running winding, and a starting winding circuit provided with a starting winding, a starter adapted for connection with an electric potential source and having starter interlock switches and a holding coil circuit for said switches, conductive means connecting said starter switches with said windings and including a first conductor connected with one switch and with said running winding, a second conductor connected between said running winding and a second of said switches, a third conductor connected between a third of said switches and said starting winding, and electromagnetic protective means operatively connected with one of said winding circuits and arranged to open said holding coil circuit in response to excessive overload current in said one of said winding circuits, said electromagnetic means including a coil, an armature operatively associated with said coil, a normally closed switch in said holding coil circuit and opened by movement of said armature, a pivoted beam connected to displace said coil armature, and counteracting means connected with said beam to yieldingly oppose the movement of said beam.

2. In an electric motor assembly which has a rotor, a running winding circuit provided with a running winding, and a starting winding circuit provided with a starting winding, a starter adapted for connection with an electric potential source and having starter interlock switches and a holding coil circuit for said switches, conductive means connecting said starter switches with said windings and including a first conductor connected with one switch and with said running winding, a second conductor connected between said running winding and a second of said switches, a third conductor connected between a third of said switches and said starting winding, and electromagnetic protective means operatively connected with one of said winding circuits and arranged to open said holding coil circuit in response to excessive overload current in said one of said winding circuits, and further electromagnetic means connected with said running winding circuit for also opening said holding circuit, said first mentioned electromagnetic means including a load coil in a circuit with said third conductor, and a coil armature associated with said load coil, a normally closed switch in said holding coil circuit, a mechanism operated by said load coil armature for opening said normally closed switch.

3. In an electric motor assembly which has a rotor, a running winding circuit provided with a running winding, and a starting winding circuit provided with a starting winding, a starter adapted for connection with an electric potential source and having starter interlock switches and a holding coil circuit for said switches, conductive means connecting said starter switches with said windings and including a first conductor connected with one switch and with said running winding, a second conductor connected between said running winding and a second of said switches, a third conductor connected between a third of said switches and said starting winding, and electromagnetic protective means operatively connected with one of said winding circuits and arranged to open said holding coil circuit in response to excessive overload current in said one of said winding circuits, and further electromagnetic means connected with said running winding circuit for also opening said holding circuit, said first mentioned electromagnetic means including a load coil in a circuit with said third conductor, and a coil armature associated with said load coil, a normally closed switch in said holding coil circuit, a mechanism operated by said load coil armature for opening said normally closed switch, said further electromagnetic means including a second load coil in said running winding circuit and having a second load coil armature, and mechanical means coupling said load coil armatures for movement thereof in response to excessive current in either the running or starting circuits.

4. The subject matter of claim 2 wherein said mechanism is a rod, said first load coil armature is a free moving metal member adapted to propel said rod.

5. The subject matter of claim 2 wherein said mechanism is a rod, said first load coil armature is a free moving metal member adapted to propel said rod, a container in which said member is captive, and a liquid buffer substance in said container.

6. The subject matter of claim 5 wherein there is a beam constituting a part of said further electromagnetic means, and said beam being attached to said container to displace said container when said beam is moved.

7. In an electric motor system including a starter provided with a holding coil and a plurality of interlock switches operatively connected with said holding coil and wherein the motor system has an electric motor equipped with a running winding and a starting winding together with a cutout switch in series with the starting winding, a protective circuit structure including electromagnetic means responsive to overload current in one of said windings for deenergizing said holding coil and thereby enabling said interlock switches to be opened, said electromagnetic means including a coil, an armature operatively associated with said coil, a normally closed switch connected to said holding coil and opened by movement of said armature, a pivoted beam connected to displace said coil armature, and counteracting means connected with said beam to yieldingly oppose the movement of said beam.

References Cited in the file of this patent
UNITED STATES PATENTS

| | | |
|---|---|---|
| 2,382,983 | Ellis | Aug. 21, 1945 |
| 2,516,538 | Armstrong | July 25, 1950 |
| 2,610,313 | Turnupseed et al. | Sept. 9, 1952 |
| 2,836,780 | List et al. | May 27, 1958 |